Jan. 11, 1927.

R. McCLENATHEN 1,614,076

GRINDING MACHINE

Filed August 2, 1924  2 Sheets-Sheet 1

Robert McClenathen
INVENTOR.

BY

ATTORNEY.

Jan. 11, 1927. 1,614,076

R. McCLENATHEN

GRINDING MACHINE

Filed August 2, 1924 2 Sheets-Sheet 2

Robert McClenathen INVENTOR.

BY

ATTORNEY.

Patented Jan. 11, 1927.

1,614,076

UNITED STATES PATENT OFFICE.

ROBERT McCLENATHEN, OF FROSTBURG, MARYLAND, ASSIGNOR TO KELLY-SPRING-FIELD TIRE COMPANY, OF CUMBERLAND, MARYLAND, A CORPORATION OF NEW JERSEY.

GRINDING MACHINE.

Application filed August 2, 1924. Serial No. 729,742.

This invention relates to an improved machine for grinding and polishing, preferably, articles of ring-like formation, such, for instance, as air bags utilized in the curing of pneumatic tire casings.

It is well-known that the exterior surfaces of these air bags become rough, cracked, and encrusted by the combined action of heat, flexation, and the migration into them of the sulphur from the tire casing to such a degree that they become prematurely unsuitable for continued use.

When thus rough, cracked, and encrusted, these bags may be renovated by simply grinding or buffing off the defective surface; and it is to perform such an operation that my machine has been designed.

In addition to the foregoing general statement of utility, this invention has for its principal objects the provisions of means for grinding down the surface of a bag more economically and rapidly than machines heretofore used by the provision of a plurality of grinding elements, simultaneously operable upon different portions of the bag.

A further object is to provide means for automatically advancing the several grinding elements, progressively and continuously over the operating surface at a uniform rate of feed whereby all portions shall be equally treated.

An additional object is to provide mechanism for automatically maintaining an approximately constant angular relation between the rotating plane of the grinding wheel and the surface of the object it operates upon throughout the progressive advance.

A still further object is to provide means for maintaining the grinding element in uniform resilient pressure contact with the working surface of the objective throughout the operation; and to accomplish all of the foregoing objects in an automatic manner to the elimination of manual attention or supervision during the operation, whereby one operative may successfully maintain a number of the machines in simultaneous action.

I am aware that heretofore machines have been used to accomplish this same purpose; for instance, such as that disclosed in U. S. Letters Patent #1,489,922 of April 8, 1924, but these previous machines have not been automatic in their operation, nor do they possess the several economical and novel features more fully discussed herein and specifically claimed.

Figure 2:
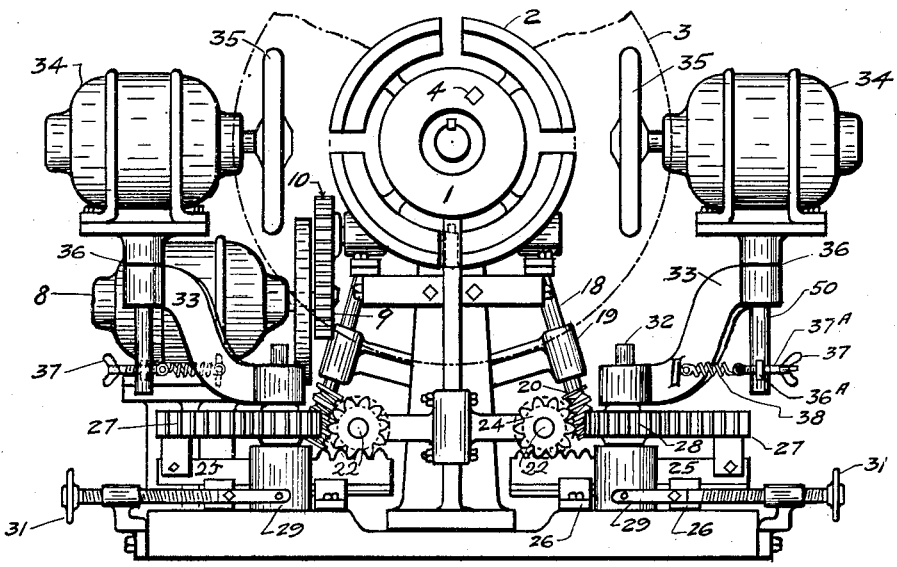
Figure 2 is an end view of the machine; the air bag being shown in broken lines.

The basic mechanical conception implies the provision of essentially duplicate grinding units, simultaneously active on opposite sides of the plane of rotation of the annular article being treated, and so arranged and co-related to the mechanism for rotating the core, as also to the mechanism for actuating each of the other grinders, that the entire objective surface of the article will be completely traversed by the automatic operation of the device. The operator need only mount the bag, set the grinders to the starting point, and turn power on the machine—the result will be automatically accomplished, and the operator may be thus enabled to successfully maintain a considerable number of the machines in simultaneous service.

The limitations inhering in grinding operations, as defined by effective relative speed of the abrading and objective surfaces, by the rate of feed, and other factors, establish a minimum time limit for the accomplishment of any definite operation. The present invention has reduced to the minimum the elapsed time for performing a definite operation by adhering to the mechanical laws for effective work by the individual grinders, yet cutting the job time at least in half by employing a plurality of grinders, each operating simultaneously and within non-conflicting zones on the work surface.

In the appended drawings, numeral 1 represents a conventional chuck having a radially expansible and contractible peripheral surface 2 adapted to engage an annular work piece 3; the usual adjusting feature 4 is incidentally shown.

The shaft 5, suitably journaled at 6 and appropriately connected to the bed plate 7, constitutes the rotating support for the chuck and, incidentally transmits certain motions, hereinafter described, to other elements.

The principal power source comprises a motor 8, transmitting through pinions 9 and 10, the latter on shaft 11 journaled at 12 in the frame 13. The worm 14 on shaft 11 engages worm wheel 15 on the main shaft 5.

Figure 1:
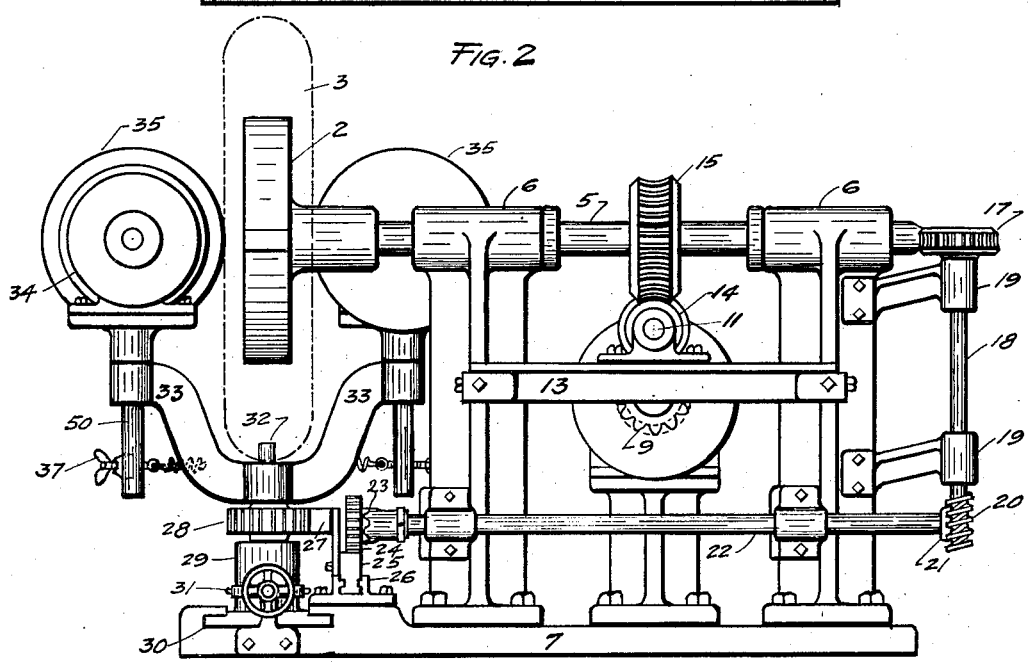
Figure 1 is a side view of the machine; the air bag being shown in broken lines.

The mechanism for manipulating the orbital swing and advance of the plural grinders, which are essentially duplicates and, therefore may be described in singular, comprise a worm 16 on the end of 5 engaging worm wheels 17 on inclined shafts 18. Shafts 18 are suitably journaled at 19 (see Figs. 1, 2 and 3) and terminate in worm 20 meshed with worm wheel 21 on countershaft 22. Conventional clutch 23 and gear 24 completes this assembly. Gear 24 meshes with one set of teeth in reciprocating rack 25 mounted in guide 26 (see Fig. 1). An additional rack 27 is attached to rack 25 with its teeth arranged vertically to mesh with gear 28 fast on a vertical pinion 32, which transmits oscillatory motion to the grinding motor support arm 33, as presently explained.

The swinging grinders are supported in a pedestal bearing 29 carried in horizontal slides 30 whereby the entire assembly, including bearing 29 and its super structure is rendered capable of movement toward and away from the chuck 2 and bag 3 thereon. To attain any desired initial adjustment of the grinders to accommodate various diameters of air bags the pedestal 29 and slide 30 may be manually shifted by any appropriate device, such, for instance, as the hand screw 31, operating through a nut fixed on the bed plate 7 and suitably connected at one of its extremities to the slidable pedestal 29 in an appropriate manner. It will be understood that this bearing 29 does not move during the grinding operation but remains in its set position.

From support bearing 29 the spindle 32 projects vertically to engage the pivot arm 33, to which it is keyed, whereby the entire superstructure above 29 is caused to rotate when the rack 27 progresses across the teeth of gear 28. It should be noted that the axis of bearing 29 is preferably located in the vertical plane of rotation of the bag 3 and in such related vertical alinement with the cross sectional center of the bag, projected downwardly from a point where it is intersected by a plane horizontally through its center of rotation, that the grinding element 35, shall always be enabled to maintain effective contact with the surface of the bag.

The motor 34 which actuates the grinder wheel 35 is pivotally journaled at 36 on the extremity of 33 whereby it may freely oscillate as the wheel 35 under the urge of its tension spring, follows the contour of the bag in grinding.

Figure 5:
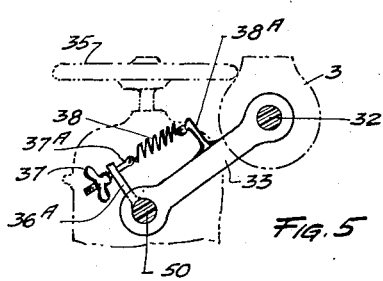
Figure 5 is a diagrammatic plan showing the spring tension means for urging the grinding wheel against the bag.

In order that an adjustable resilient contact of wheel 35 may be had with the bag 3, a tension device, comprising a wing nut 37 on a screw 37$^A$ attached to a spring 38 which in turn is tied into an extension 38$^A$ on the arm 33, is provided. This tension system is made operable to urge the grinder habitually against the bag by its association through a lug 36$^A$ extending from and fast to the motor support spindle 50. Through this contrivance it will be appreciated that a constant and uniform pressure of the wheel 35 may be maintained against the bag as the motor on its arm 33 swings orbitally about the surface under treatment. (See Fig. 5.)

It will be understood that the motor and its base are fast upon the head of the journaled spindle 50 and free to rotate on the part 36; and that the angular relation of the motor axis with its swinging arm 33 is subjected to appropriate variation, automatically, as determined by the constantly changing relation of the wheel 35 on the irregular surface of bag 3; all of which does not affect the constant tension drawing the wheel against the bag.

To restrict the amplitude of swing of motor 34 and its associated grinding wheel 35 under the turning impulse of spring 38, especially when the assembly is inoperative, appropriate stops (not shown) may be incorporated between the carrier arm 33 and a rotating portion.

Figure 3:
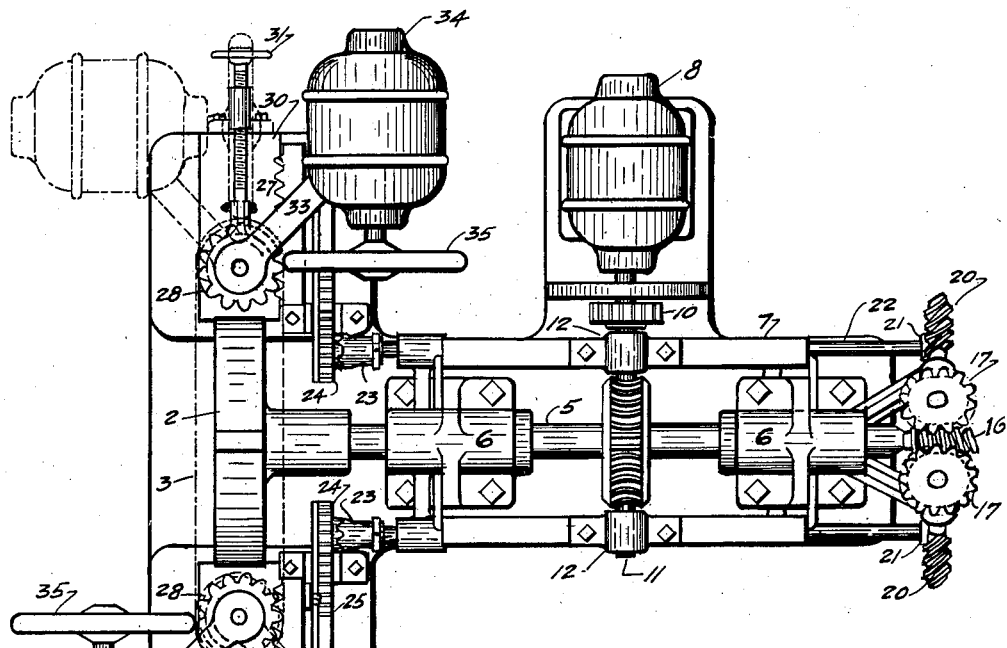
Figure 3 is a plan view, showing, in solid lines, the position of the grinding wheels of each unit when they have partially completed their orbit about the operating surface; and, in broken lines, the ultimate position of these elements upon the completion of their work.
Figure 4:
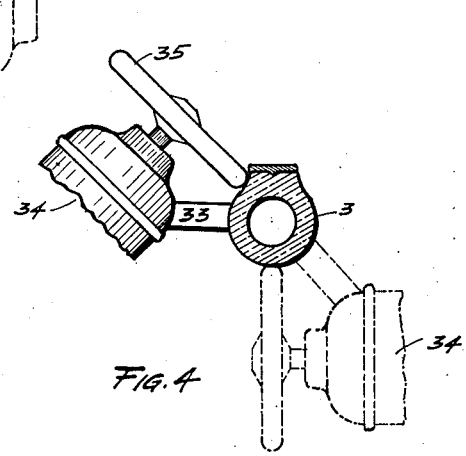
Figure 4 is a diagrammatic representation of the full orbital travel of the grinder attachment from start, in full lines, to finish, in broken lines.

The operation of the machine is as follows:

We will assume that the grinding wheel is in the position shown in dotted lines in Figs. 3 and 4, except that the air bag is not in place on chuck and the vertical support 29 has not been adjusted. The operator takes an air bag from any suitable supply and places it on the adjustable surface 2 of the chuck 1; he then expands the surface 2 by turning nut 4 until the air bag 3 is gripped tight on its inner circumference by the surface 2. Having placed the air bag in position, the operator then throws the clutch 23 out of engagement with gear 24. This allows gear 24 to run as an idler. Then the operator places the vertical support 29, by turning the hand wheel 31, so that a perpendicular line axial of the vertical support 29 coincides, approximately with the center of the transverse section of that portion of the air bag intersected by a horizontal plane through the axis of the air bag. This places the grinding wheel 35 so that it will reach the starting part of the operation. The vertical support 29 being in the position as described above, the operator then swings the motor 34 with its wheel 35 around on its pivot arm 33; this places the wheel in the position shown in solid lines in Fig. 4. In swinging, the pivot arm 33 causes revolution of the gear 28 which, in turn, back runs the racks 27 and 25 to their zero or starting point. He then adjusts his tension on the grinding wheel 35 by tightening or loosening the thumb screw 37. He then throws in the clutch 23 and starts the machine, and the wheel 35 acts upon the rotating air bag during the period of slow rotation of the pivot arm 33 by the action of the previously described gearing.

The automatically controlled swing of the arm 33 causes the motor-driven wheel to slowly progress from the inner portion of the bag 3, outwardly, with the cutting edge resiliently urged thereagainst until one-half of the bag has been traversed, whereupon the operator removes the completed work; for the opposed grinding wheel has completed a like operation.

It will be understood that the mechanism here shown is casually illustrative of the basic principle of the invention, merely in the interest of disclosing a preferred embodiment; therefore, I do not wish to limit the claims to the mechanical features disclosed.

What I claim is:

1. A device of the character described, comprising; means for supporting and rotating an annular work piece; a plurality of power grinding units shiftably mounted upon opposite sides of said work piece; means for simultaneously and automatically advancing said grinders over the surface of said work piece orbitally whereby each grinder treats approximately one-half of the objective surface; and means for maintaining the grinders in contact with said surface, resiliently, throughout their advance.

2. A device of the character described, comprising; power driven means for supporting and rotating an annular work piece; a plurality of power grinding units mounted to permit progressive advance about the sectional contour of the objective surface; resilient pressure means for maintaining contact between the grinders and the work surface; and means synchronized with the work rotating means for moving the grinders, automatically, over the objective work surface.

3. A device of the character described, comprising; power driven means for supporting and rotating an annular work piece having a transversely curved peripheral contour; a plurality of power grinding units mounted on opposite sides of said work piece to permit progressive advance about the sectional contour thereof within different operating zones; and means for automatically advancing the said grinders, simultaneously, at a common feed rate over the objective work surface.

4. A device of the character described, comprising; rotatable means for centering and retaining an annular work piece having a transversely curved peripheral contour; a plurality of power grinding units mounted at diametrically opposed and on opposite sides of said work piece to permit progressive advance about the sectional contour thereof within different operating zones; and means for automatically advancing said grinders, simultaneously, from positions remote from the medial plane of rotation of said work piece toward said plane at a common feed rate over the objective work surface.

In testimony whereof I affix my signature.

ROBERT McCLENATHEN.